US006854697B2

(12) United States Patent
Akaike

(10) Patent No.: US 6,854,697 B2
(45) Date of Patent: Feb. 15, 2005

(54) STOPPER DEVICE AND TELESCOPIC UNIT

(75) Inventor: Mitsuru Akaike, Tokyo (JP)

(73) Assignees: Nihon Velbon Seiki Kogyo Kabushiki Kaisha, Tokyo (JP); Hakuba Shashin Sangyo Kabushiki, Tokyo (JP)

( * ) Notice: Subject to any disclaimer, the term of this patent is extended or adjusted under 35 U.S.C. 154(b) by 83 days.

(21) Appl. No.: 09/852,225

(22) Filed: May 9, 2001

(65) Prior Publication Data

US 2002/0030146 A1 Mar. 14, 2002

(30) Foreign Application Priority Data

Sep. 12, 2000 (JP) ........................................ 2000-277253

(51) Int. Cl.⁷ ............................................. F16M 11/00
(52) U.S. Cl. ................. 248/161; 248/188.5; 248/176.3; 248/407; 403/109.1; 403/377; 403/374.5
(58) Field of Search ............................. 248/161, 125.1, 248/188.5, 125.8, 177.1, 176.3, 157, 248.4, 407, 410, 412, 423; 403/104, 110, 109.1, 109.2, 109.5, 373, 374.5, 377, 374.1, 374.2

(56) References Cited

U.S. PATENT DOCUMENTS

| | | | | | |
|---|---|---|---|---|---|
| 713,794 | A | * | 11/1902 | Ostermann | 248/177.1 |
| 2,282,285 | A | * | 5/1942 | Olson | 248/169 |
| 2,817,548 | A | * | 12/1957 | Uthemann | 403/104 |
| 2,841,425 | A | * | 7/1958 | Oeters | 403/104 |
| 2,927,757 | A | * | 3/1960 | Omuhundro et al. | 248/413 |
| 3,589,757 | A | * | 6/1971 | Mooney | 403/105 |
| 3,856,253 | A | * | 12/1974 | Seebinger | 248/411 |
| 4,029,279 | A | * | 6/1977 | Nakatani | 248/188.5 |
| 4,324,477 | A | * | 4/1982 | Miyazaki | 248/163.1 |
| D280,908 | S | * | 10/1985 | Nakatani | D16/45 |
| 4,648,697 | A | * | 3/1987 | Kawazoe | 248/163.1 |
| D290,963 | S | * | 7/1987 | Groschupp | D16/244 |
| 4,761,092 | A | * | 8/1988 | Nakatani | 403/104 |
| 4,932,622 | A | * | 6/1990 | Hayakawa | 248/188.5 |
| D327,083 | S | * | 6/1992 | Hayakawa | D16/245 |
| D333,479 | S | * | 2/1993 | Chun-Mao | D16/244 |
| 5,267,712 | A | * | 12/1993 | Shen | 248/179.1 |
| 5,341,185 | A | * | 8/1994 | Nakatani | 396/428 |
| 5,449,104 | A | * | 9/1995 | Parsons et al. | 224/245 |
| 5,564,661 | A | * | 10/1996 | Gershon | 248/167 |
| 5,617,980 | A | * | 4/1997 | Parsons et al. | 224/251 |
| 6,142,699 | A | * | 11/2000 | Pao | 403/109.5 |
| 6,322,027 | B1 | * | 11/2001 | Hsu | 248/177.1 |
| 6,536,723 | B1 | * | 3/2003 | Nakatani | 248/163.1 |
| 2002/0141812 | A1 | * | 10/2002 | Edelen et al. | 403/109.1 |
| 2003/0042388 | A1 | * | 3/2003 | Peterson | 248/440.1 |
| 2003/0090904 | A1 | * | 5/2003 | Ching | 362/413 |

FOREIGN PATENT DOCUMENTS

DE          3441225 A1  *  5/1986

* cited by examiner

Primary Examiner—Ramon O. Ramirez
Assistant Examiner—Naschica S. Morrison
(74) Attorney, Agent, or Firm—Darby & Darby

(57) ABSTRACT

A first stopper supporting member (31), supporting a stopper (35) which controls movement of a second tubular member (22) of a telescopic unit (15) along a first tubular member (21), is disposed around the outer surface of the first tubular member (21). A second stopper supporting member (31a), supporting a stopper (35) which controls movement of a third tubular member (23) along the second tubular member (22) is disposed around the outer surface of the second tubular member (22). A facing end (71) of the first stopper supporting member (31) and a facing end (72) of the second stopper supporting member (31a) have nearly the same outer diameter. The resulting telescopic unit (15) is both attractive in appearance and free from the problem of being inadvertently caught by another object.

10 Claims, 7 Drawing Sheets

STOPPER DEVICE AND TELESCOPIC UNIT

BACKGROUND OF THE INVENTION

The present invention relates to a stopper device for controlling movement of a tubular member along another tubular member. The invention also relates to a telescoping device provided with this stopper device.

Conventional telescopic units of this type include a telescopic unit 1 shown in FIG. 11. A stopper device 2 of telescopic unit 1 has a plurality of tubular members (not shown in the drawing) and generally cylindrical stopper supporting members 3 respectively supporting the stoppers. With respect to the configuration of each stopper, one tubular member is associated with another tubular member in that the other tubular member moves along the one tubular member. Each stopper is adapted to control the movement of the other tubular member. Stopper supporting members 3 are each similar in shape and have dimensions respectively corresponding to the diameters of the tubular members.

Each stopper supporting member 3 is so formed as to extend straight from one of the axial ends to the other axial end, with the two axial ends having nearly the same dimension.

Therefore, when the conventional telescopic unit 1 is contracted to its minimum length, as shown in FIG. 11, an annular indentation 5 is formed between each stopper supporting member 3 and its adjacent stopper supporting member 3. Such a structure presents the possibility of another object getting inadvertently caught in indentation 5.

OBJECTS AND SUMMARY OF THE INVENTION

It is an object of the present invention to provide a stopper device and a telescopic unit which are capable of preventing inadvertent catching.

Briefly stated, the present invention provides a first stopper supporting member, supporting a stopper which controls movement of a second tubular member of a telescopic unit along a first tubular member, which is disposed around the outer surface of the first tubular member. A second stopper supporting member, supporting a stopper which controls movement of a third tubular member along the second tubular member, is disposed around the outer surface of the second tubular member. A facing end of the first stopper supporting member and a facing end of the second stopper supporting member have nearly the same outer diameter. The resulting telescopic unit is both attractive in appearance and free from the problem of being inadvertently caught by another object.

A stopper device according to an embodiment of the present invention includes at least one stopper and at least one generally cylindrical stopper supporting member. Each stopper is adapted such that, in the state where one tubular member has another tubular member inserted therein, the stopper controls movement of the other tubular member along the one tubular member. Each stopper supporting member is fitted to the outer surface of the one tubular member and adapted to support the stopper, wherein each stopper supporting member is designed such that the outer dimension of one of its axial ends (hereinafter called the former end) is greater than the outer dimension of the other axial end (hereinafter called the latter end).

In the structure described above, the outer dimension of an end of the stopper supporting member that is fitted to the outer surface of the one tubular member is set at a value greater than the outer dimension of the other end of the stopper supporting member, corresponding to the facing end of another stopper supporting member provided on the outer surface of the tubular member located immediately above the one tubular member. This structure prevents a catching indentation between the adjacent stopper supporting members.

A stopper device according to a feature of the present invention is a stopper device as described above, wherein each stopper supporting member has a tapered shape, with its outer dimension gradually increasing from the aforementioned latter end to the former end.

As each stopper supporting member has a tapered shape, with its outer dimension gradually increasing from the aforementioned latter end to the former end, this structure improves the stopper device from an aesthetic point of view while more reliably preventing inadvertent catching.

A stopper device according to a feature of the present invention is a stopper device as described above, wherein the stopper device includes rotation operating levers, each of which pushes a stopper associated therewith so as to press the stopper against the outer surface of another tubular member, thereby causing the stopper to prevent the other tubular member from moving. Alternatively, the rotation operating levers cause the stopper to permit the other tubular member to move by releasing the stopper from the position where it is pressed against the other tubular member. Each stopper supporting member has a stopper supporting hole and a pair of bearing portions. The stopper supporting hole, formed at about the midpoint along the axial length of the stopper supporting member, receives and supports the stopper therein. The bearing portions are formed at either axial end of the stopper supporting member so that they are spaced apart and face toward each other, with the stopper supporting hole located therebetween. The bearing portions support a supporting shaft portion of the rotation operating lever in such a manner as to permit the supporting shaft portion to rotate.

With the structure as above, it is possible to design the bearing portion, provided at the larger end of each stopper supporting member, to have a relatively short length while having a given strength sufficient to endure the force applied from the supporting shaft portion of the rotation operating lever. Therefore, this embodiment of the present invention permits the offset distance of the stopper from the axial center of the stopper supporting member to be greater than that of the conventional structure and, consequently, appropriately prevents rattling of the tubular member.

A stopper device according to another feature of the present invention is a stopper device as described above, wherein each rotation operating lever is provided with an operating tab portion having a shape corresponding to the outer shape of the stopper supporting member thereof. This structure prevents a catching indentation from being formed between an operating tab portion and its adjacent operating tab portion.

According to another embodiment of the present invention, there is provided a telescopic unit having a first tubular member, a second tubular member disposed in the first tubular member in such a way as to be capable of moving along the axis of the first tubular member so that the distance by which the second tubular member projects from the first tubular member can be changed by thus moving the second tubular member, a third tubular member disposed in the second tubular member in such a way as to be capable of moving along the axis of the second tubular member so that the distance by which the third tubular member projects from the second tubular member can be changed by thus moving the third tubular member, a generally tube-shaped first stopper supporting member fitted to the outer surface of said first tubular member and adapted to support a stopper which serves to control movement of said second tubular member along the first tubular member, and a generally tube-shaped first stopper supporting member fitted to the outer surface of said second tubular member and adapted to support a stopper which serves to control movement of said third tubular member along the second tubular member, wherein one of the ends of the first stopper supporting member, i.e. the end facing said second stopper supporting member, is formed into a facing end. The end of the second stopper supporting member facing the first stopper supporting member is formed into another facing end, which will be located adjacent to said facing end of the first stopper supporting member when the second tubular member is adjusted to project from the first tubular member by the minimum distance. The facing end of the first stopper supporting member and the facing end of the second stopper supporting member are designed to have nearly the same outer dimensions.

According to the structure described above, the facing end of the first stopper supporting member and the facing end of the second stopper supporting member have nearly the same outer dimensions. Therefore, even if the distance by which the second stopper supporting member projects is set at a minimum distance, no catching indentation is formed between the first stopper supporting member and its adjacent second stopper supporting member. This embodiment of the present invention prevents the stopper supporting members from inadvertently getting caught by another object.

A telescopic unit according to a feature of the present invention is a telescopic unit as described above, wherein the first stopper supporting member and the second stopper supporting member together form a continuously tapered shape when the second stopper supporting member is adjusted to project from the first tubular member by the minimum distance.

With the structure as above, in the state where the second stopper supporting member projects by the minimum distance, the first stopper supporting member and the second stopper supporting member together form a continuously tapered shape. Therefore, this structure more reliably prevents a stopper supporting member from inadvertently getting caught by another object while providing a more attractive appearance.

The above, and other objects, features, and advantages of the present invention will become apparent from the following description read in conjunction with the accompanying drawings, in which like reference numerals designate the same elements.

BRIEF DESCRIPTION OF THE DRAWINGS

FIG. 9 shows another embodiment of a stopper supporting member of a stopper device according to the present invention, wherein

FIG. 10 shows yet another embodiment of a stopper supporting member of a stopper device according to the present invention, wherein

DETAILED DESCRIPTION ON THE INVENTION

Figure 3:
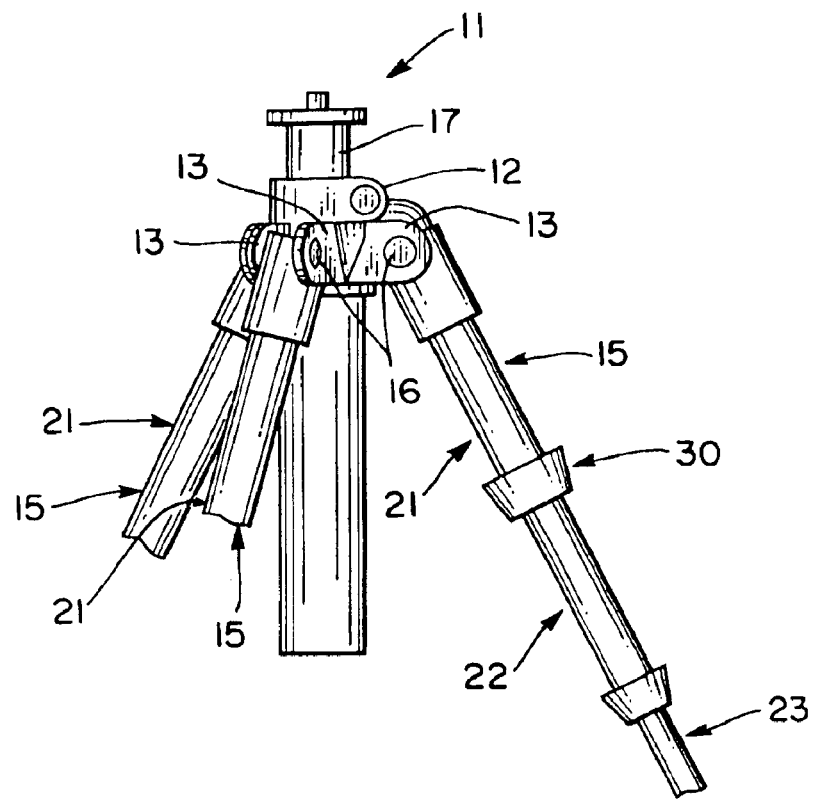
FIG. 3 is a partially omitted front view of a tripod using the telescopic unit of the present invention.

Referring to FIG. 3, a tripod 11 has a base member 12 with three leg attachments 13, each of which is attached to a telescopic unit 15. Each telescopic unit 15, serving as a leg unit, is attached to the corresponding leg attachment 13 through a horizontal shaft portion 16 so that telescopic unit 15 can swing around shaft portion 16, thereby adjusting its position. An elevator rod 17 is mounted on base member 12 in such a way that the height of elevator rod 17 is adjustable. A panhead (not shown), which may be used with a camera, is removably attached to the top of elevator rod 17.

Each one of the three telescopic units 15 has a leg structure comprised of a plurality of segments, preferably three or more segments. For example, each telescopic unit 15 of one embodiment of the present invention has seven segments having a similar shape, each segment having a circular cross section. The seven segments consist of a first tubular member 21, a second tubular member 22, a third tubular member 23, a fourth tubular member (not shown), a fifth tubular member (not shown), a sixth tubular member (not shown) and a seventh tubular member (not shown), all of which are coaxially arranged in the descending order from first tubular member 21 at the top. Of the seven segments, first tubular member 21 has the largest diameter, while the seventh tubular member has the smallest diameter.

Second tubular member 22 is positioned inside first tubular member 21 such that second tubular member 22 moves along substantially the same central longitudinal axis of first tubular member 21. The distance by which second tubular member 22 projects from first tubular member 21 can be changed by moving second tubular member 21 along this axis. Likewise, third tubular member 23 is positioned inside second tubular member 22 such that third tubular member 23 moves along substantially the same central longitudinal axis of second tubular member 22. The distance by which third tubular member 23 projects from second tubular member 22 can be changed by moving third tubular member 22 along this axis. The fourth tubular member is positioned inside third tubular member 23 such that the fourth tubular member moves along substantially the same central longitudinal axis of third tubular member 23. The distance by which the fourth tubular member projects from third tubular member 23 can be changed by moving the fourth tubular member along this axis. The fifth tubular member is positioned inside the fourth tubular member such that the fifth tubular member moves along substantially the same central longitudinal axis of the fourth tubular member. The distance by which the fifth tubular member projects from the fourth tubular member can be changed by moving the fifth tubular member along this axis. The sixth tubular member is positioned inside the fifth tubular member such that the sixth tubular member moves along substantially the same central longitudinal axis of the fifth tubular member. The distance by which the sixth tubular member projects from the fifth tubular member can be changed by moving the sixth tubular member along this axis. The seventh tubular member is positioned inside the sixth tubular member such that the seventh tubular member moves along substantially the same central longitudinal axis of the sixth tubular member. The distance by which the seventh tubular member projects from the sixth tubular member can be changed by moving the seventh tubular member along the axis.

Figure 1:
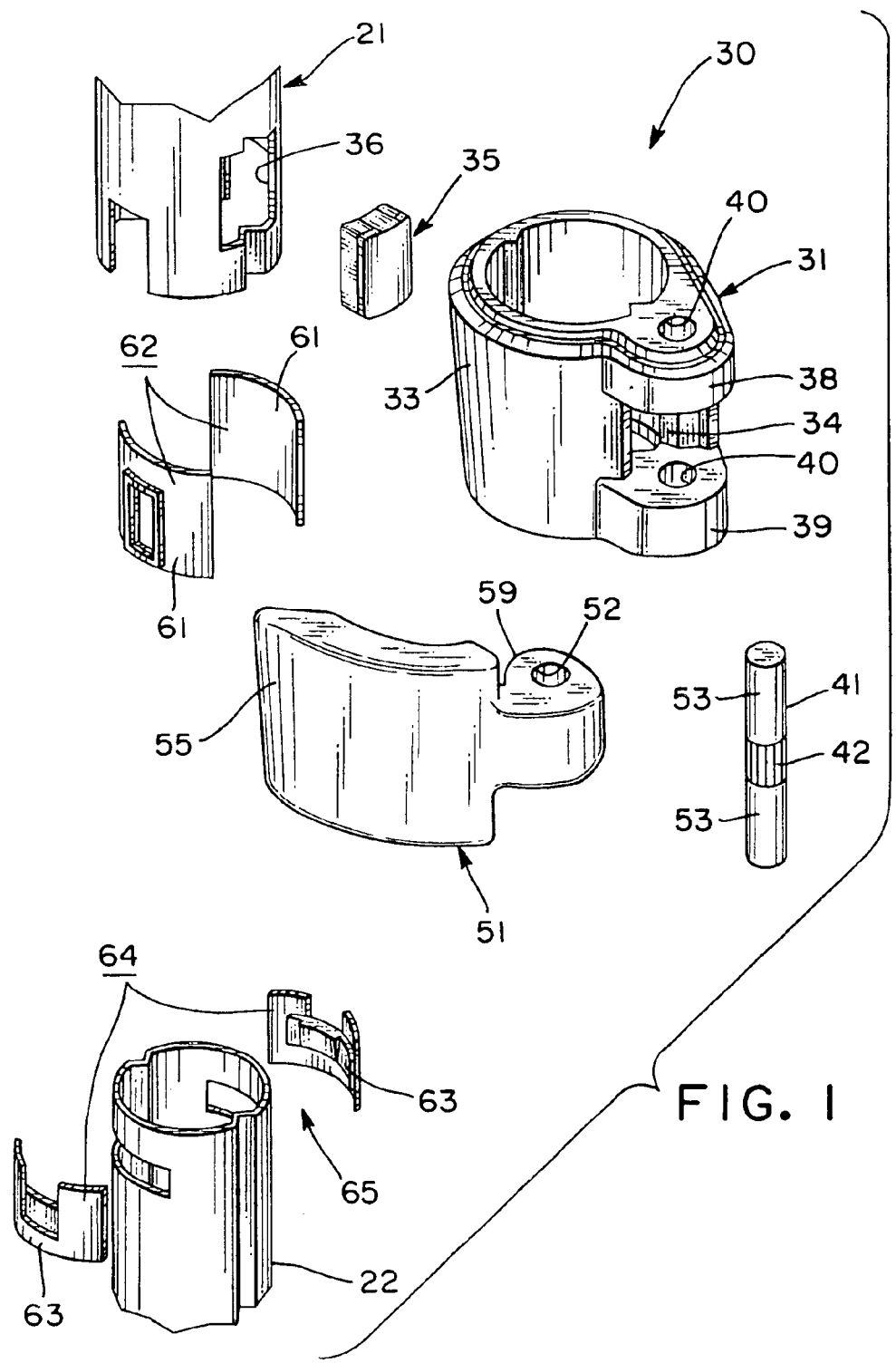
FIG. 1 is an exploded perspective view of a stopper device of a telescopic unit according to the present invention.
Figure 2:
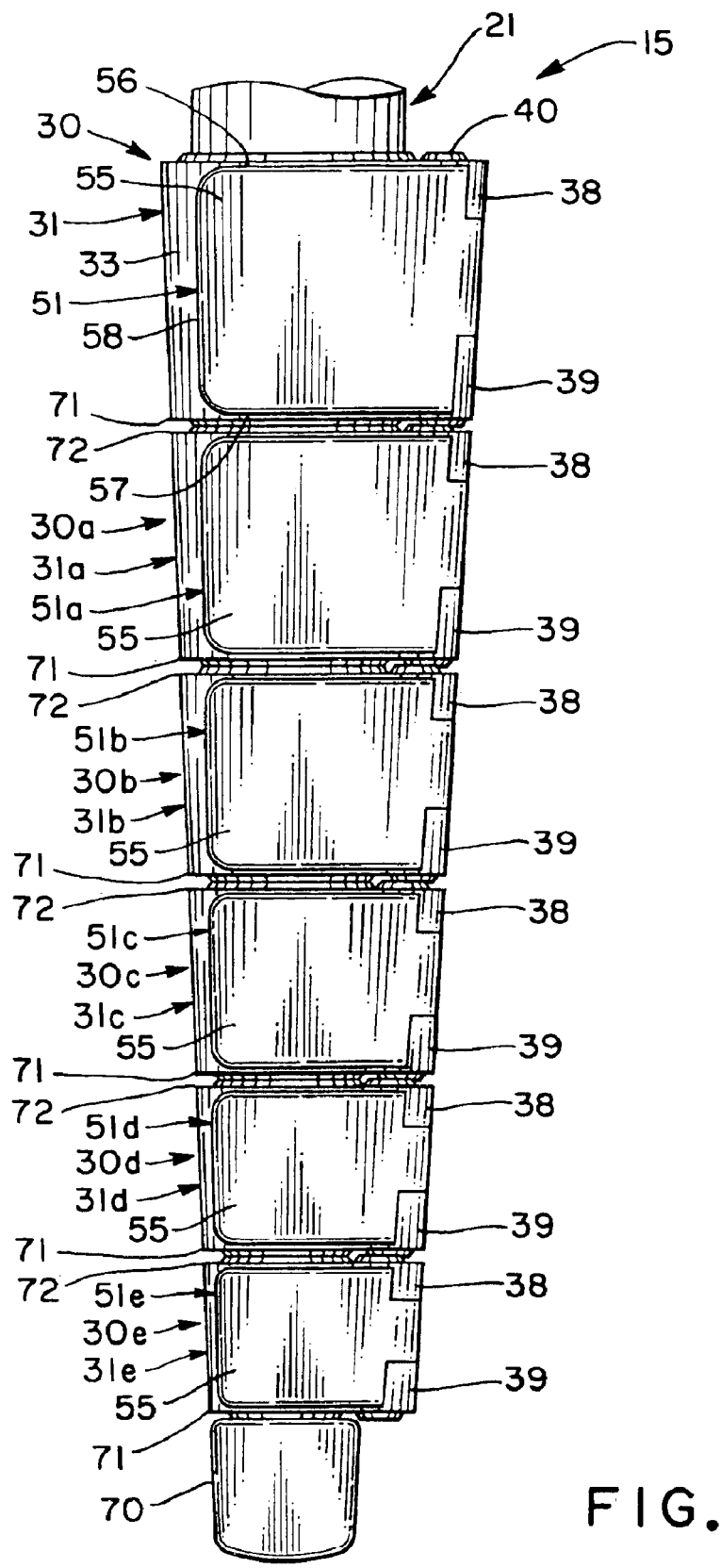
FIG. 2 is a front view of the telescopic unit of FIG. 1.

Referring to FIGS. 1 through 3, first tubular member 21, which serves as a tubular member, has a first stopper device 30 disposed at one of the two axial ends of the first tubular member 21, i.e. at the bottom of the first tubular member 21.

First stopper device 30 includes a generally cylindrical first stopper supporting member 31 which is fitted around the outer cylindrical face of the bottom portion of first tubular member 21. First stopper device 30 serves as a stopper supporting member.

First stopper supporting member 31 has a tapered shape, with its outer dimension, gradually increasing from the bottom to the top of first stopper supporting member 31. To be more specific, the outer diameter of one of the axial ends of first stopper supporting member 31, i.e. the upper end, is set at a diameter greater than the outer diameter of the other axial ends, i.e. the lower end, of first stopper supporting member 31.

The first stopper supporting member 31 includes a fitting cylindrical portion 33 having a shape of a frustum fitted around the outer cylindrical surface of the bottom of first tubular member 21. A stopper supporting hole 34 is formed in the side face of fitting cylindrical portion 33, at about the midpoint along the axial length of fitting cylindrical portion 33. A stopper 35, which is preferably a crimp-type member having the shape of an elastic rectangular plate, is disposed in stopper supporting hole 34 so as to control the axial movement of second tubular member 22 by appropriately permitting or preventing its movement along first tubular member 21. Stopper 35 snugly fits in, and is thus supported by, stopper supporting hole 34. A stopper-dedicated hole 36, formed in the bottom of first tubular member 21, at a location facing stopper supporting hole 34, communicates with stopper supporting hole 34.

First and second bearing portions 38 and 39, having a generally semicircular cross section, are formed integrally with fitting cylindrical portion 33. Bearing portions 38 and 39 are spaced apart, located at either axial end, i.e. the top and bottom, of fitting cylindrical portion 33, with stopper supporting hole 34 located therebetween Bearing portions 38 and 39 project outward so as to oppose each other. A shaft insertion through hole 40 is bored through each bearing portion 38 and 39. The center axis of each shaft insertion through hole 40 extends parallel with the center axis of fitting cylindrical portion 33. Although it is not shown in any one of the attached drawings, the center axis of shaft insertion through holes 40 does not always have to be parallel with the central axis of the fitting cylindrical portion 33. The center axis of shaft insertion through holes 40 may correspond to the inclination of tapered fitting cylindrical portion 33.

The two axial ends of a supporting shaft 41 are respectively positioned inside shaft insertion through holes 40 of first and second bearings 38 and 39. A spline shaft portion 42, which is the entire portion of supporting shaft 41 except for the aforementioned two axial ends, is positioned inside a shaft insertion through hole 52 of a first rotation operating lever 51. First rotation operating lever 51 is thus attached through to first stopper supporting member 31 by means of supporting shaft 41 such that first rotation operating lever 51 easily pivots. In other words, first rotation operating lever 51 pivots around supporting shaft 41, which serves as a supporting shaft portion 53 of first rotation operating lever 51. Supporting shaft 40 is supported by first and second bearing portions 38 and 39 of first stopper supporting member 31.

First rotation operating lever 51 has an operating tab portion 55, preferably in the shape of a curved plate having a curvature corresponding to the outer shape of first stopper supporting member 31. In other words the shape of first rotation operating lever 51 is preferably the same general shape as that of the outer surface of fitting cylindrical portion 33.

Referring specifically to FIG. 2, operating tab portion 55 may have two edges having different lengths, i.e. a top edge 56 and a bottom edge 57, and a front edge 58 that connects the respective front ends of top and bottom edges 56 and 57. Front edge 58 is preferably slanted at an angle corresponding to the inclination of first stopper supporting member 31.

When operating tab portion 55 operates toward fitting cylindrical portion 33, pivoting first rotation operating lever 51 around supporting shaft 41 in one direction, stopper 35 is pushed by a cam surface 59 of first rotation operating lever 51 until it is elastically deformed to some extent and pressed through stopper-dedicated hole 36 of first tubular member 21 against the outer surface of second tubular member 22. As a result, stopper 35 prevents sliding movement of second tubular member 22 along first tubular member 21, thereby locking second tubular member 22.

When operating tab portion 55 is operated so that first rotation operating lever 51 pivots around supporting shaft 41 in the direction opposite the aforementioned direction, stopper 35 is released from the state of being pressed against the outer surface of second tubular member 22 by cam surface 59. As a result, second tubular member 22 is freed to move along first tubular member 21. In this state, the distance by which second tubular member 22 projects from first tubular member 21 can be changed.

Referring now to FIG. 1, first tubular member 21 has a receiving portion 62 which includes a pair of receiving members 61, each having the shape of a curved plate, fitted around the inner cylindrical surface of one of the axial ends, i.e. the bottom end, of first tubular member 21. Second tubular member 22, located under first tubular member 21, has a catching portion 64 which includes a pair of catching members 63, each having the shape of a curved plate, fitted around the inner cylindrical surface of one of the axial ends, i.e., the upper end, of second tubular member 22.

With the configuration as above, when second tubular member 22 extends from first tubular member 21 to its fullest extent, the bottom edge of catching portion 64, which is fitted around the upper end portion of second tubular member 22 and extends slightly inward, removably catches the top edge of receiving portion 62, which is fitted around the bottom of first tubular member 21 and extends slightly inward, thereby preventing second tubular member 22 from slipping off of first tubular member 21. Thus, receiving portion 62 and catching portion 64 together form a displacement preventing means 65.

Referring to FIGS. 4 through 8, the explanation is given hereunder of an axial length A of first bearing portion 38 of first stopper supporting member 31 and an axial length B of second bearing portion 39 of first stopper supporting member 31.

Figure 4:
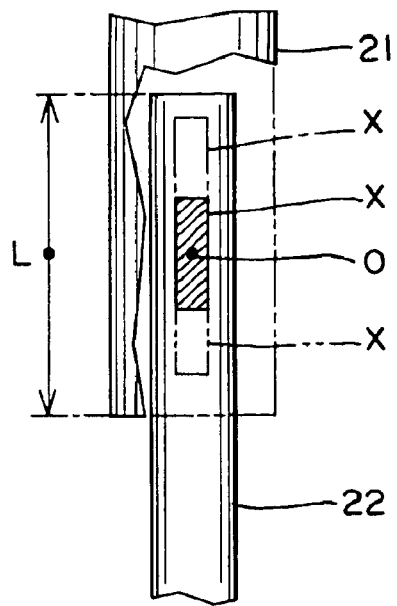
FIG. 4 is a schematic illustration to explain the state where the second tubular member of the telescopic unit is projected to the fullest extent.

FIG. 4 shows the state where second tubular member 22 projects from first tubular member 21 to its fullest extent. In FIG. 4, the letter L denotes the axial length of the portion where first tubular member 21 overlaps second tubular member 22 when second tubular member 22 projects to its fullest extent from first tubular member 21.

Now, consider the location of the pressed portion X where stopper 35 is pressed against the outer surface of second tubular member 22. In view of prevention of rattling of second tubular member 22, the portion defined by solid lines, i.e. the location where the center O of the pressed portion X corresponds to the midpoint of the length L, is ideal for the position of the pressed portion X, as compared with the portion defined by chain lines or two-dot chain lines.

According to conventional art, however, the portion defined by the two-dot chain lines i.e. the portion where the center O of the pressed portion X is located lower than the midpoint of the length L, is regarded as the most appropriate position.

Figure 5:
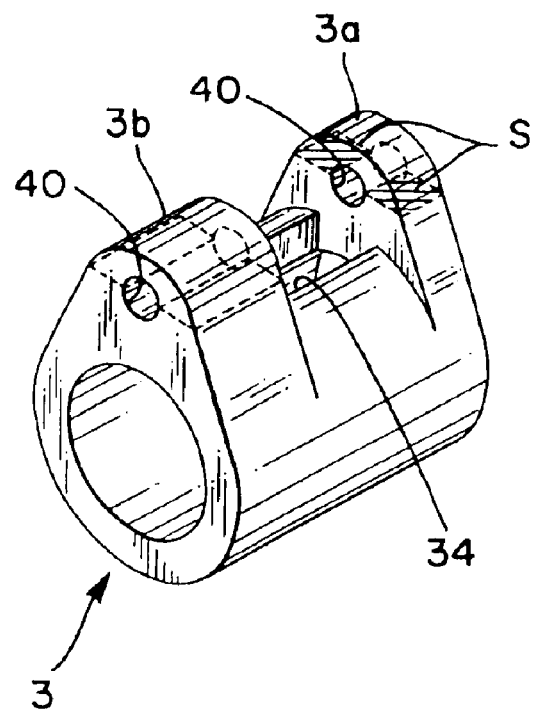
FIG. 5 is a perspective view of a conventional straight stopper supporting member.
Figure 6:
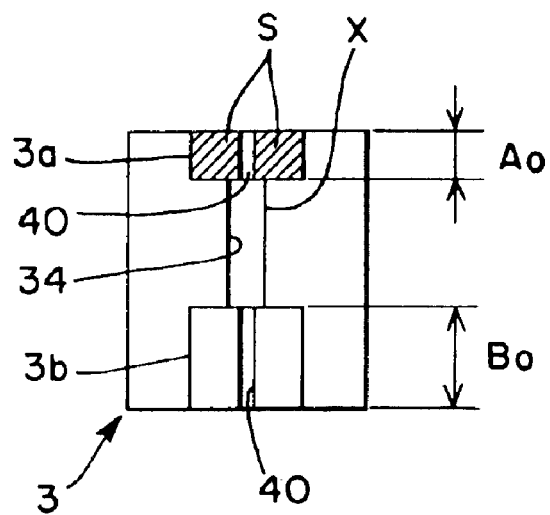
FIG. 6 is a schematic illustration showing the axial length of a bearing portion of the conventional straight stopper supporting member of FIG. 5.

Referring to FIGS. 5 and 6, in case of a conventional stopper supporting member 3 that extends in a straight line, the axial lengths of first and second bearing portions 3a and 3b are respectively set at A0 and B0. The area S of the portion defined by diagonal lines in FIGS. 5 and 6, which is the area of the cross section of first bearing portion 3a including the center axis of shaft insertion through hole 40, is set at a minimum value, provided that it is within the range where first bearing portion 3a is capable of enduring the force applied from the supporting shaft portion of the rotation operating lever when stopper 35 is pushed.

Figure 7:
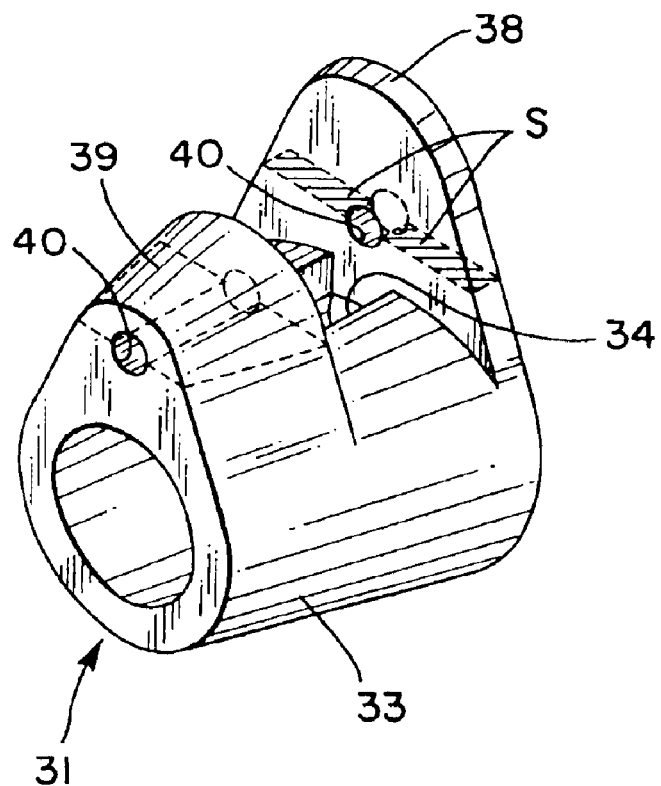
FIG. 7 is a perspective view of a tapered stopper supporting member according to the present invention.
Figure 8:
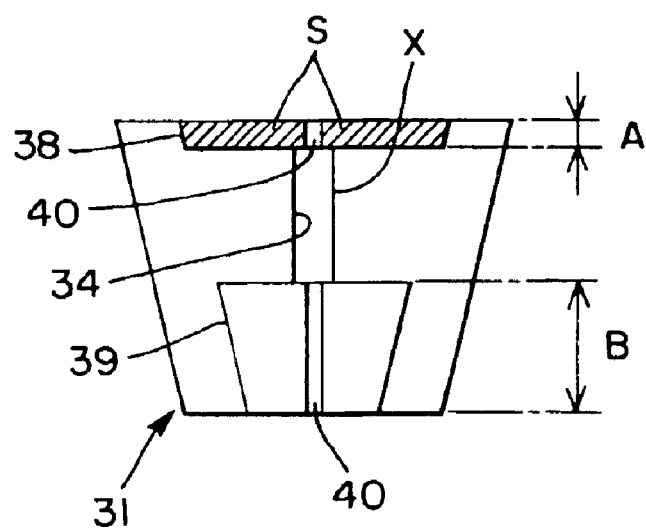
FIG. 8 is a schematic illustration showing the axial length of a bearing portion of a tapered stopper supporting member according to the present invention.

Referring to FIGS. 7 and 8, in case of tapered first stopper supporting member 31 of the present invention, however, the axial lengths of first and second bearing portions 38 and 39, which are respectively represented by A and B, are set such that the axial length A of first bearing portion 38 is shorter than A0, while the axial length B of second bearing portion 39 is longer than B0.

Furthermore, as is true in the area S shown in FIGS. 5 and 6, first stopper supporting member 31 is also arranged such that the area S of the portion defined by diagonal lines in FIGS. 7 and 8, which is the area of the cross section of first bearing portion 38 including the center axis of the shaft insertion through hole 40, is the minimum size, provided that it is within the range where the bearing is capable of enduring the force applied from the supporting shaft portion of the rotation operating lever when stopper 35 is pushed.

As described above, the axial length A of first bearing portion 38 of tapered first stopper supporting member 31 is so set as to be shorter than the axial length A0 of first bearing portion 3a of the conventional straight stopper supporting member 3. This means that the offset distance of stopper supporting hole 34 (in other words, stopper 35) from the axial center of first stopper supporting member 31 is greater than that of the conventional structure. As a result, compared with the conventional structure, the invention is more effective in preventing rattling of second tubular member 22, with the pressed portion X approaching the ideal position.

In the same manner as first tubular member 21 described above, the second through the sixth tubular members are respectively provided with second through sixth stopper devices 30a, 30b, 30c, 30d and 30e, each of which is located at one of the axial ends, i.e. the bottom end, of the corresponding tubular member. A rubber cap 70, serving as a shoe, is preferably affixed to the bottom of the seventh tubular member.

Each of the second through sixth stopper devices 30a, 30b, 30c, 30d and 30e has the same structure as that of first stopper device 30 described above except for different dimensions. The first through sixth stopper devices 30, 30a, 30b, 30c, 30d and 30e have similar shapes respectively corresponding to first, second and third tubular members 21, 22 and 23, and the remaining tubular members not shown in the drawings.

To be more specific, the second through sixth stopper supporting members 31a, 31b, 31c, 31d and 31e shown in FIG. 2 have shapes similar to that of first stopper supporting member 31, differing from first stopper supporting member 31 only in their dimensions. The second through sixth rotation operating lever 51a, 51b, 51c, 51d and 51e shown in FIG. 2 have shapes similar to that of first rotation operating lever 51, differing from first stopper supporting member 51 only in their dimensions.

As it is evident from FIG. 2, the first through sixth stopper supporting members 31, 31a, 31b, 31c, 31d and 31e are designed such that, when the second through seventh tubular members are arranged to project from the upper tubular members to their least extent, the first through sixth stopper supporting members 31, 31a, 31b, 31c, 31d and 31e form, as a whole, a continuously tapered shape having an outer diameter gradually decreasing from the top to the bottom.

In other words, a facing end 71 (the bottom) of first stopper supporting member 31 and a facing end 72 (the top) of second stopper supporting member 31a, which are adjacent and face each other when the distance by which second tubular member 22 projects from first tubular member 21 is set at the minimum length, are designed to have nearly the same outer diameter. Likewise, each pair of facing ends 71 and 72 of the second through six stopper supporting members 31a, 31b, 31c, 31d and 31e have nearly the same outer diameter.

In the same manner as second tubular member 22, each one of the third through seventh tubular members has such a structure as to prevent inadvertent displacement of the tubular member by a displacement preventing means 65, which is principally comprised of a receiving portion 62 and a catching portion 64.

When taking photographs with a camera by using a tripod 11 that has a structure described above, the camera is mounted on the panhead, and the height of the camera is adjusted.

The adjustment of the height of the camera is explained hereunder. In case, for example, the second through seventh tubular members of telescopic units 15 are arranged to project to the fullest extent, the second through seventh tubular members are released from the locked state and then pulled outward along the interior of the first through sixth tubular members, in which they are respectively fitted. Each catching portion 64 is brought into the catching position with the corresponding receiving portion 62. Thereafter, the first through sixth rotation operating levers 51, 51a, 51b, 51c, 51d and 51e are tilted to lock the second through seventh tubular members with their respective stoppers 35.

In the locked state described above, the second through seventh tubular members are less prone to rattling than are those of the conventional structure, because they are secured at positions closer to the ideal positions by their respective stoppers 35.

After the height of the camera is adjusted, other adjustments, such as the angle and orientation of the camera, are done by means of the panhead or the like. Thereafter a photograph is taken.

After photography is finished, tripod 11 may be stored away into a storage means, e.g. a bag. At that time, the distance by which the second through seventh tubular members of telescopic units 15 project is set at the minimum length by releasing the second through seventh tubular members from the locked state and then pushing them back into the first through sixth tubular members. Thereafter, the first through sixth rotation operating levers 51, 51a, 51b, 51c, 51d and 51e are tilted to lock the second through seventh tubular members with their respective stoppers 35.

In the locked state described above, the first through sixth stopper supporting members 31, 31a, 31b, 31c, 31d and 31e form, as a whole, a continuously tapered shape shown in FIG. 2, which has an outer diameter gradually decreasing from the top to the bottom. No catching indentations are formed between each stopper supporting member and its adjacent stopper supporting members 31, 31a, 31b, 31c, 31d and 31e. Therefore, tripod 11 is smoothly put into a bag without getting caught at any part.

Figure 9A:
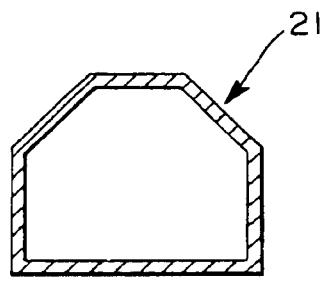
FIG. 9(a) is a sectional view of a tubular member having a hexagonal cross section.
Figure 9B:
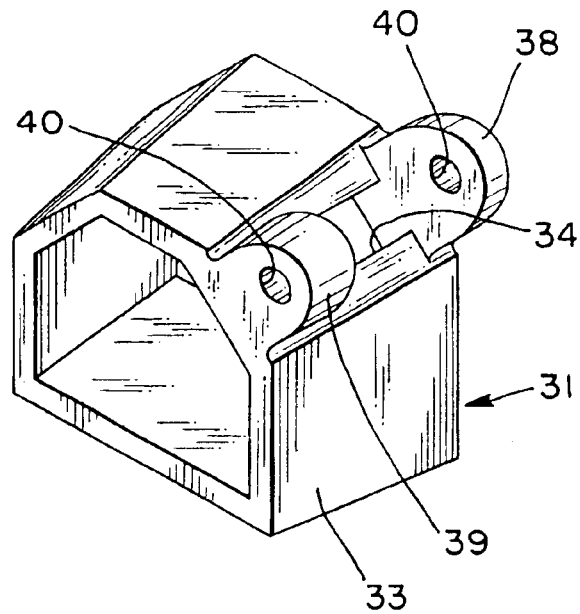
FIG. 9(b) is a perspective of a stopper supporting member in the shape of a generally hexagonal tube.
Figure 10A:
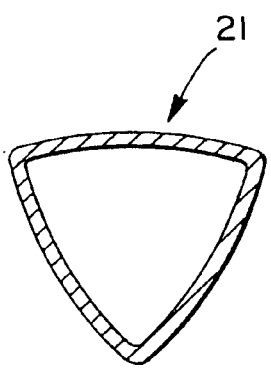
FIG. 10(a) is a sectional view of a tubular member having a triangular cross section.
Figure 10B:
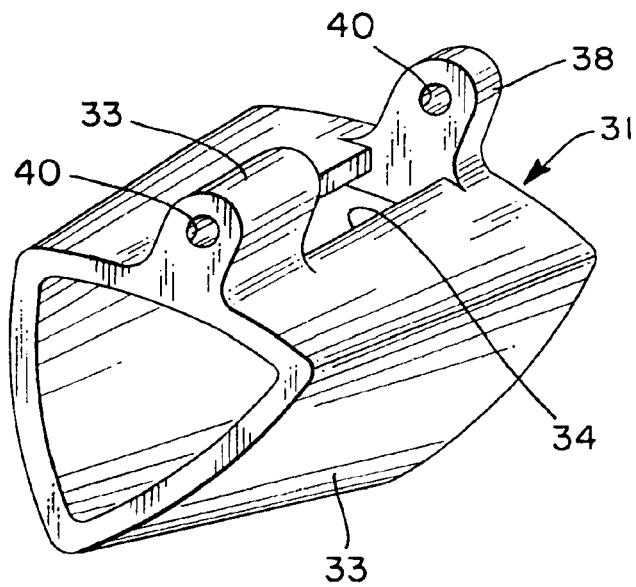
FIG. 10(b) is a perspective of a stopper supporting member in the shape of a generally triangular tube.
Figure 11:
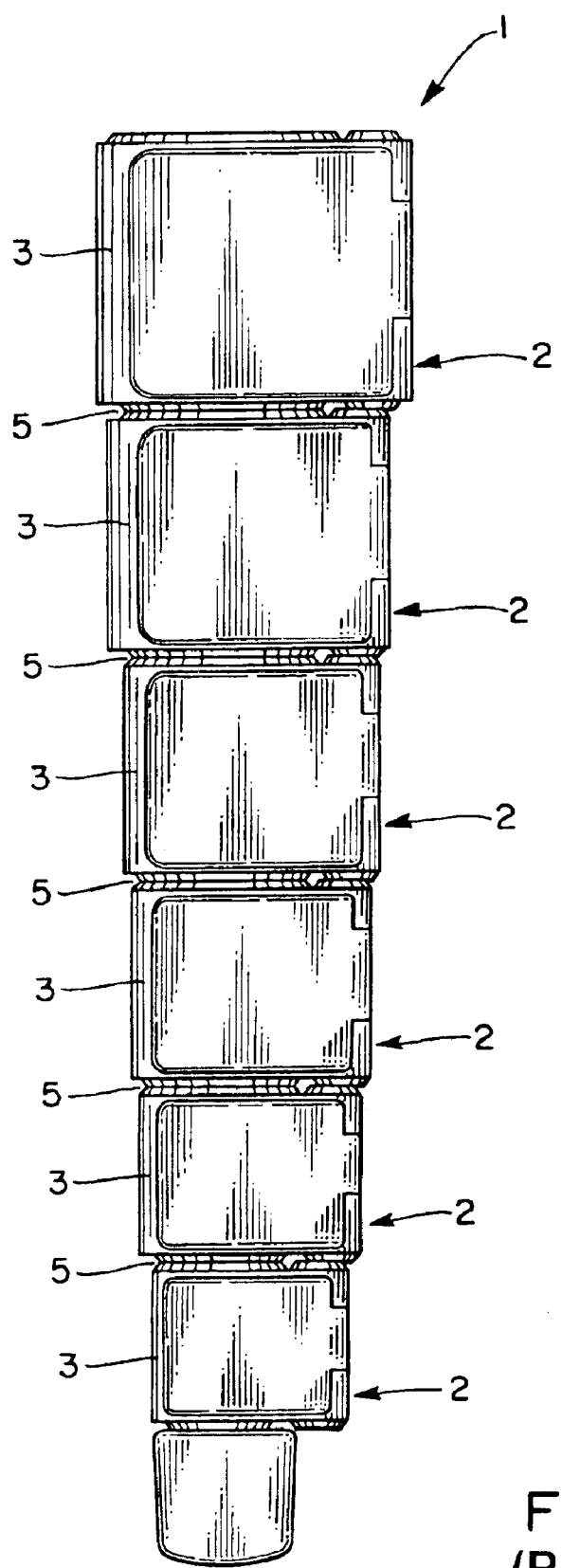
FIG. 11 is a front view of a conventional telescopic unit.

The embodiment has been described above, referring to the example wherein first tubular member 21 has a generally circular cross section, while first stopper supporting member 31 is formed in a tapered shape having a generally circular cross section corresponding to first tubular member 21. However, in case each tubular member 21 has a hexagonal cross section as shown in FIG. 9(a), stopper supporting members 31, too, are formed in a tapered shape having a hexagonal cross section as shown in FIG. 9(b). In case each tubular member 21 has a triangular cross section as shown in FIG. 10(a), stopper supporting members 31 are formed in a tapered shape having a triangular cross section as shown in FIG. 10(b).

According to the embodiments described above, stopper supporting members 31 are formed in a tapered shape having an outer dimension gradually decreasing from the one of the axial end to the opposing end. Although they are not shown in the drawings, there are other permissible shapes, such as one having the axial middle portion extending outward and another that is caved at the axial middle portion.

Furthermore, according to the embodiments described above, each stopper supporting member 31 is provided with a pivotable rotation operating lever 51. However, although it is not shown in the drawings, a structure which calls for making the stopper supporting members 31 themselves rotatable, forming a cam surface directly on each stopper supporting member 31 is also permissible.

The shape of the operating tab portion 55 of each rotation operating lever 51 is not limited to a curved shape having a curvature corresponding to the shape of the stopper supporting members 31. Operating tab portion 55 may be formed in the shape of a flat, narrow strip. The center axis of rotation of each rotation operating lever 51 may be inclined in any desired direction.

Furthermore, according to the embodiments described above, telescopic units 15 are used as the legs of a tripod. However, although it is not shown in the drawings, a telescopic unit 15 of the invention is also applicable to a one-leg stand or a unipod.

According to an embodiment of the present invention, by setting the outer dimension of an end (hereinafter called the former end) of the stopper supporting member that is fitted to the outer surface of said one tubular member at a value which is greater than the outer dimension of the other end (hereinafter called the latter end) of the stopper supporting member and corresponds to the facing end of another stopper supporting member provided on the outer surface of the tubular member located immediately above the one tubular member, it is possible to prevent formation of a catching indentation between the adjacent stopper supporting members, and, consequently, prevent a stopper supporting member from inadvertently getting caught by another object.

According to a feature of the present invention, each stopper supporting member has a tapered shape with its outer dimension gradually increasing from the aforementioned latter end to the former end. Therefore, the present invention improves the stopper device from an aesthetic point of view, while more reliably preventing inadvertent catching.

According to another feature of the present invention, the bearing portion provided at the larger end of each stopper supporting member may have a relatively short length while ensuring a given strength that is sufficient for the bearing portion to endure the force applied from the supporting shaft portion of the rotation operating lever. Therefore, the present invention makes it possible to set the offset distance of the stopper from the axial center of the stopper supporting member greater than that of the conventional structure, thereby appropriately preventing rattling of the tubular member.

The device of the present invention is free from the problem of a catching indentation being formed between an operating tab portion and its adjacent operating tab portion. Consequently, the present invention prevents the stopper supporting members from inadvertently getting caught by another object.

According to another embodiment of the present invention, the facing end of the first stopper supporting member and the facing end of the second stopper supporting member have nearly the same outer diameter. Therefore, even if the distance by which the second stopper supporting member projects is set at a minimum distance, no catching indentation is formed between the first stopper supporting member and its adjacent second stopper supporting member. Thus, the present invention prevents the stopper supporting members from inadvertently getting caught by another object.

According to a feature of the present invention, the first stopper supporting member and the second stopper supporting member together form a continuously tapered shape in the state where the distance by which the second stopper supporting member projects is set at a minimum distance. Therefore, the present invention more reliably prevents a stopper supporting member from inadvertently getting caught by another object while also aesthetically improving the stopper device.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A stopper device comprising:
   a stopper;
   a first tubular member;
   a second tubular member fitting inside said first tubular member;
   said stopper controlling movement of said second tubular member with respect to said first tubular member;
   a stopper supporting member, fitted to an outer surface of said first tubular member, supporting said stopper;
   said stopper supporting member having a first end and a second, opposite end;
   said second end being proximate to a location where said second tubular member slides in and out of said first tubular member;
   a first diameter of said first end being greater than a second diameter of said second end;
   at least a third tubular member fitting inside said second tubular member;
   at least a second stopper controlling movement of said third tubular member with respect to said second tubular member;
   at least a second stopper supporting member fitted to an outer surface of said second tubular member;
   said second stopper supporting member having a third end and fourth, opposite end;
   said second end of said stopper supporting member having substantially the same outer dimensions as said third end of said second stopper supporting member,
   wherein said stopper supporting member has a tapered shape, with a diameter gradually increasing from said second end to said first end,
   said second stopper supporting member has a tapered shape, with a diameter gradually increasing from said fourth end to said third end, and
   said stopper supporting member and said second stopper supporting member are formed with different outer dimensions.

2. The stopper device according to claim 1 further comprising:
   a rotation operating lever, pushing said stopper against or moving said stopper away from an outer surface of said second tubular member, thereby causing said stopper to prevent said second tubular member from moving when said stopper is pressed against said outer surface, or causing said stopper to permit said second tubular member to move by releasing said stopper from being pressed against said outer surface;
   first and second bearing portions, facing each other at opposite ends of said stopper supporting member;
   a stopper supporting hole, between said first and second bearing portions;
   said stopper supporting hole formed at about a midpoint along an axial length of the overlapping portions of the first and second tubular members;
   said stopper fitting in said stopper supporting hole.

3. The stopper device according to claim 2, wherein said stopper supporting hole is formed at the overlapping portions of the first and second tubular members.

4. The stopper device according to claim 2, wherein said rotation operating lever has an operating tab portion having a shape corresponding to the outer shape of the stopper supporting member.

5. The stopper device according to claim 1 further comprising:
   a rotation operating lever, pushing said stopper against or moving said stopper away from an outer surface of said second tubular member, thereby causing said stopper to prevent said second tubular member from moving when said stopper is pressed against said outer surface, or causing said stopper to permit said second tubular member to move by releasing said stopper from being pressed against said outer surface;
   first and second bearing portions, facing each other at opposite ends of said stopper supporting member;
   a stopper supporting hole, between said first and second bearing portions;
   said stopper fitting in said stopper supporting hole;
   a supporting shaft portion of said rotation operating lever being supported by said first and second bearing portions, permitting rotation thereof.

6. The stopper device according to claim 5, wherein said stopper supporting hole is formed at the overlapping portions of the first and second tubular members.

7. A stopper device according to claim 1 further comprising:
   first and second bearing portions disposed on said stopper supporting member;
   a stopper supporting hole between said first and second bearing portions;
   said stopper supporting hole formed at about a midpoint along an axial length of an overlapping portion of the first member and an overlapping portion of the second tubular member; and
   said stopper fitting in said stopper supporting hole.

8. A stopper device comprising:
   a stopper;
   a first tubular member;
   a second tubular member fitting inside said first tubular member;
   said stopper controlling movement of said second tubular member with respect to said first tubular member;
   a stopper supporting member, fitted to an outer surface of said first tubular member, supporting said stopper;
   said stopper supporting member having a first end and a second, opposite end;
   said second end being proximate to a location where said second tubular member slides in and out of said first tubular member;
   a first diameter of said first end being greater than a second diameter of said second end;
   at least a second stopper;
   at least a third tubular member;
   said third tubular member fitting inside said second tubular member;
   said second stopper controlling movement of said third tubular member with respect to said second tubular member;
   at least a second stopper supporting member, fitted to an outer surface of said second tubular member;
   said second stopper supporting member having a third end and a fourth, opposite end;
   said fourth end of said second stopper supporting member being proximate to a location where said third tubular member slides in and out of said second tubular member; and a third diameter of said third end of said second stopper supporting member being substantially the same diameter as said second diameter of said second end of said stopper supporting member, whereby when said second tubular member is completely inserted in said first tubular member, said stopper supporting member meets said second stopper supporting member, forming a substantially even outer surface therebetween, wherein said stopper supporting member has a tapered shape, with a diameter gradually increasing from said second end to said first end, said second stopper supporting member has a tapered shape, with a diameter gradually increasing from said fourth end to said third end, and said stopper supporting member and said second stopper supporting member are formed with different outer dimensions.

9. A telescopic unit comprising:

a first tubular member;

a second tubular member disposed in said first tubular member, moving along an axis of said first tubular member whereby the distance by which said second tubular member projects from said first tubular member is adjusted by moving said second tubular member;

a third tubular member disposed in said second tubular member, moving along an axis of said second tubular member whereby the distance by which said third tubular member projects from said second tubular member is adjusted by moving said third tubular member;

a first stopper controlling movement of said second tubular member along said first tubular member;

a first stopper supporting member, fitted to an outer surface of said first tubular member, supporting said first stopper;

a second stopper controlling movement of said third tubular member along said second tubular member;

a second stopper supporting member, fitted to an outer surface of said second tubular member, supporting said second stopper;

a first facing end of said first stopper supporting member facing said second stopper supporting member;

a third end of said first stopper supporting member opposite to said first facing end of said first stopper supporting member, said third end having a larger outer dimension than an outer dimension of said first facing end;

a second facing end of said second stopper supporting member facing said first stopper supporting member;

said first facing end being located adjacent to said second facing end when said second tubular member is adjusted to project from said first tubular member by a minimum distance; and said first facing end and said second facing end having substantially the same outer dimensions, wherein said first stopper supporting member and said second stopper supporting member together form a continuously tapered shape when said second stopper supporting member is adjusted to project from said first tubular member by a minimum distance, and said first stopper supporting member and said second stopper supporting member are formed with different outer dimensions.

10. A telescopic unit according to claim 9 further comprising;

a second diameter of said second facing end of said second stopper supporting member being substantially the same diameter as a first diameter of said first facing end of said stopper supporting member, whereby when said second tubular member is completely inserted in said first tubular member, said stopper supporting member meets said second stopper supporting member, forming a substantially even outer surface therebetween.

* * * * *

UNITED STATES PATENT AND TRADEMARK OFFICE
CERTIFICATE OF CORRECTION

PATENT NO. : 6,854,697 B2 Page 1 of 1
APPLICATION NO. : 09/852225
DATED : February 15, 2005
INVENTOR(S) : Mitsuru Akaike It is certified that error appears in the above-identified patent and that said Letters Patent is hereby corrected as shown below:

Title page, item [73]
In The Assignee:

Please delete "Nihon Velbon Seiki Kogyo Kabushiki Kaisha, Tokyo (JP); Hakuba Shashin Sangyo Kabushiki, Tokyo (JP)" and substutite -- Nihon Velbon Seiki Kogyo Kabushiki Kaisha, Tokyo (JP); Hakuba Shashin Sangyo Kabushiki Kaisha, Tokyo (JP) --.

Signed and Sealed this

First Day of May, 2007

JON W. DUDAS
*Director of the United States Patent and Trademark Office*